United States Patent
Akash et al.

(10) Patent No.: US 11,586,354 B2
(45) Date of Patent: Feb. 21, 2023

(54) TECHNIQUES FOR ROLE ASSIGNMENT OF COMPONENTS OF A DISTRIBUTED APPLICATION

(71) Applicant: EMC IP Holding Company LLC, Hopkinton, MA (US)

(72) Inventors: Bathulwar Akash, Telangana (IN); Piyush Tibrewal, Pune (IN); Aditya Sriram Mattaparthi, Bangalore (IN); Suprava Das, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/162,249

(22) Filed: Jan. 29, 2021

(65) Prior Publication Data
US 2022/0244850 A1 Aug. 4, 2022

(51) Int. Cl.
*G06F 3/06* (2006.01)
(52) U.S. Cl.
CPC ............ *G06F 3/0604* (2013.01); *G06F 3/067* (2013.01); *G06F 3/0629* (2013.01)
(58) Field of Classification Search
None
See application file for complete search history.

(56) References Cited

U.S. PATENT DOCUMENTS

| | | | | |
|---|---|---|---|---|
| 9,667,490 B1* | 5/2017 | Emelyanov | ......... | H04L 41/0816 |
| 11,150,957 B1* | 10/2021 | Ferreira | ................ | G06F 9/5011 |
| 2011/0246460 A1* | 10/2011 | Hsieh | .................... | G06F 16/182 |
| | | | | 709/202 |
| 2017/0177611 A1* | 6/2017 | Gowdappa | ............ | G06F 16/182 |

OTHER PUBLICATIONS

Vert.x, "Vert.x Core Manual," Eclipse Vert.x, 2021, https://vertx.io/docs/vertx-core/java/.

* cited by examiner

*Primary Examiner* — Edward J Dudek, Jr.
*Assistant Examiner* — Ralph A Verderamo, III
(74) *Attorney, Agent, or Firm* — Muirhead and Saturnelli, LLC

(57) ABSTRACT

The role of a node component of a distributed application may be changed without the need to terminate a current OS process implementing the node component. A first component on a first node of a distributed file server may be designated as a control path master and configured to execute a first group of services defined for the control path master as part of a first OS process. One or more other components on one or more other nodes of the distributed file server may be designated as a control path agent and configured to execute a second group of services defined for the control path agent as part of a respective second OS process. The control path master may be changed to a control path agent, and a control path agent may be changed to a control path master, without having to reboot the control path component in question.

20 Claims, 5 Drawing Sheets

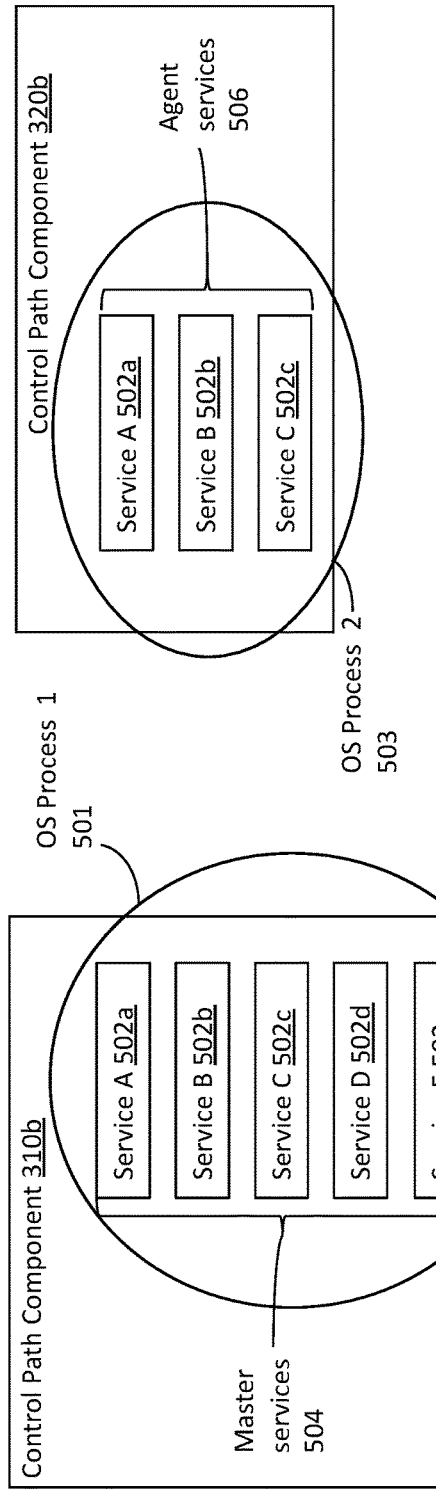
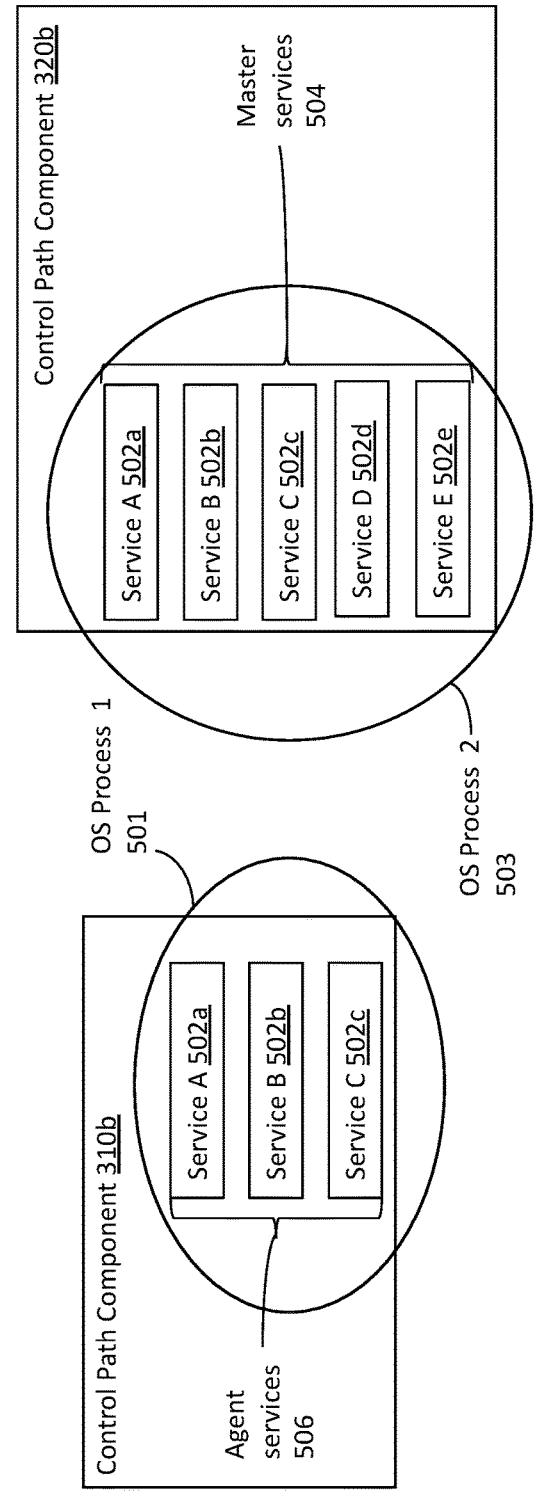
FIG. 5A
FIG. 5B

TECHNIQUES FOR ROLE ASSIGNMENT OF COMPONENTS OF A DISTRIBUTED APPLICATION

BACKGROUND

Technical Field

This application generally relates to data storage systems, and more particularly to managing node components on a storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (IO) operations utilizing a physical storage device of the storage system, one or more components of the host system, storage system and network components therebetween may be used. The one or more combinations of components of the host, switch and storage system over which IO operations between an application and storage device can be communicated may be considered an IO path between the application and the storage device. These IO paths define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In some embodiments of the invention, a method is performed for a storage system including a cluster of processing nodes collectively executing a distributed application, where a first of the processing nodes serves a first role of a functional component of the distributed application, the first role defined by a first group of one or more services. The method includes: the first processing node serving the first role by executing the first group of one or more services as part of a first operating system process; determining to change the first role of the first processing node to a second role of the functional component, the second role defined by a second group of one or more services; and changing the first role of the first processing node to a second role, while the first operating system process continues to execute, by changing the first group of one or more services of the functional component to the second group of one or more services such that the second group is executed as part of the first operating system process. Each service of the first group and each service of the second group may be an independently executable unit of instructions. The operating system process may include a plurality of threads, where each of the one or more services of the first group and the one or more services of the second group are executable by any of the plurality of threads asynchronously. Changing the first group of one or more services of the functional component to the second group of one or more services may include at least one of: undeploying one or more of the executable units that constitute the one or more services, respectively, of the first group so that the undeployed executable units are no longer executable by the first operating system process; or deploying one or more of the executable units that constitute the one or more services, respectively, of the second group so that the one or more deployed executable units are executable by the first operating system process. The distributed application may be a distributed file system, and the functional component may be a control path component of the distributed file system. The first role may be a master control path component that: receives control path requests, executes control path functions and delegates execution of control path functions to agent control path components, and the second role may be an agent control path component that: executes control path functions delegated by the master control path component; does not received control path requests; and does not delegate execution of control path functions. At least a second of the plurality of nodes initially serves the second role of the functional component by executing the second group of one or more services as part of a second operating system process, and the method further may include changing the second role of the second processing node to the first role, while the second operating system process continues to execute, by changing the second group of one or more services executed by the second processing node to the first group of one or more services such that the first group is executed as part of the second operating system process.

In other embodiments of the invention, a storage system includes: a cluster of processing nodes collectively executing a distributed application, where a first of the processing nodes serves a first role of a first functional component of the distributed application, the first role defined by a first group of one or more services; and executable logic that implements a method. The method includes: the first processing node serving the first role by executing the first group of one or more services as part of a first operating system process; determining to change the first role of the first processing node to a second role of the functional component, the second role defined by a second group of one or more services; and changing the first role of the first processing node to a second role, while the first operating system process continues to execute, by changing the first group of one or more services of the functional component to the second group of one or more services such that the second group is executed as part of the first operating system process. Each service of the first group and each service of the second group may be an independently executable unit of instructions. The operating system process may include a plurality of threads, where each of the one or more services of the first group and the one or more services of the second group are executable by any of the plurality of threads asynchronously. Changing the first group of one or more services of the functional component to the second group of one or more services may include at least one of: undeploying one or more of the executable units that constitute the one or more services, respectively, of the first group so that the undeployed executable units are no longer executable by the first operating system process; or deploying one or more of the executable units that constitute the one or more services, respectively, of the second group so that the one or more deployed executable units are executable by the first operating system process. The distributed application may be a distributed file system, and the functional component may be a control path component of the distributed file system. The first role may be a master control path component that: receives control path requests, executes control path functions and delegates execution of control path functions to agent control path components, and the second role may be an agent control path component that: executes control path functions delegated by the master control path component; does not received control path requests; and does not delegate execution of control path functions. At least a second of the plurality of nodes initially serves the second role of the functional component by executing the second group of one or more services as part of a second operating system process, and the method further may include changing the second role of the second processing node to the first role, while the second operating system process continues to execute, by changing the second group of one or more services executed by the second processing node to the first group of one or more services such that the first group is executed as part of the second operating system process.

In other embodiments of the invention, computer-readable media is provided for a storage system including a cluster of processing nodes collectively executing a distributed application, where a first of the processing nodes serves a first role of a first functional component of the distributed application, the first role defined by a first group of one or more services. The computer-readable media has software stored thereon, the software including: executable code that controls the first processing node to serve the first role by executing the first group of one or more services as part of a first operating system process; executable code to determine to change the first role of the first processing node to a second role of the functional component, the second role defined by a second group of one or more services; and executable code that changes the first role of the first processing node to a second role, while the first operating system process continues to execute, by changing the first group of one or more services of the functional component to the second group of one or more services such that the second group is executed as part of the first operating system process. Each service of the first group and each service of the second group may be an independently executable unit of instructions. The operating system process may include a plurality of threads, where each of the one or more services of the first group and the one or more services of the second group are executable by any of the plurality of threads asynchronously. Changing the first group of one or more services of the functional component to the second group of one or more services may include at least one of: undeploying one or more of the executable units that constitute the one or more services, respectively, of the first group so that the undeployed executable units are no longer executable by the first operating system process; or deploying one or more of the executable units that constitute the one or more services, respectively, of the second group so that the one or more deployed executable units are executable by the first operating system process. The distributed application may be a distributed file system, and the functional component may be a control path component of the distributed file system. The first role may be a master control path component that: receives control path requests, executes control path functions and delegates execution of control path functions to agent control path components, and the second role may be an agent control path component that: executes control path functions delegated by the master control path component; does not received control path requests; and does not delegate execution of control path functions.

BRIEF DESCRIPTION OF THE DRAWINGS

Features and advantages of the present invention will become more apparent from the following detailed description of illustrative embodiments thereof taken in conjunction with the accompanying drawings in which:

FIGS. 5A and 5B illustrate an example of changing roles of node components of a distributed application, according to embodiments of the invention.

DETAILED DESCRIPTION OF EMBODIMENTS

Figure 1:
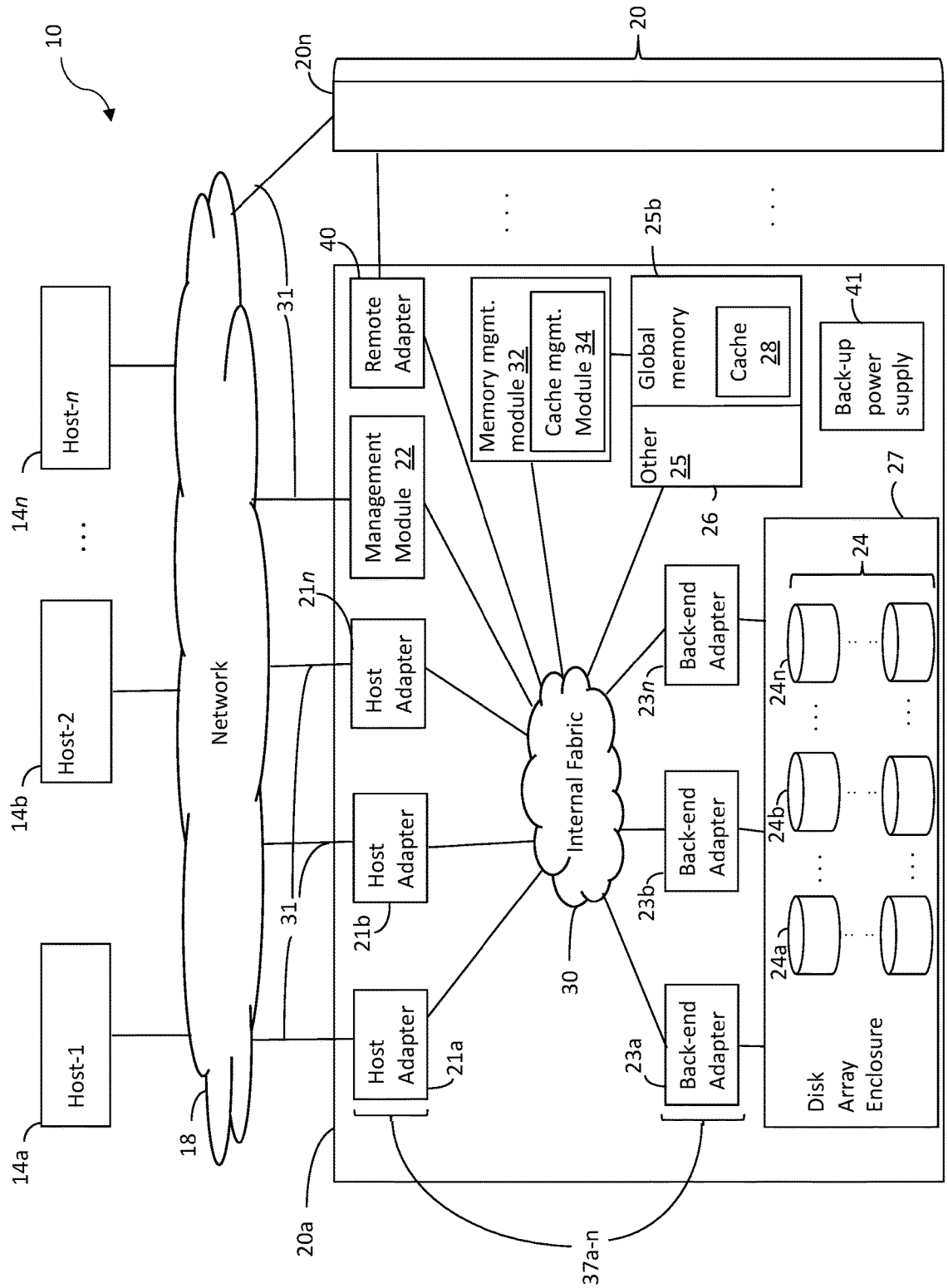
FIG. 1 is a block diagram illustrating an example of a data storage network, according to embodiments of the invention.

Some storage systems provide file-level services to host systems, for example, by providing one or more file-level (as opposed to block-level) servers over a network. Such servers include network-attached storage (NAS) servers, for example, Dell EMC™ Unity™ storage systems made available by EMC Corporation ("Dell EMC") of Hopkinton, Mass. In some cases, a storage system may provide file servers (e.g., NAS servers) in addition to block-level services. For example, a PowerMax™ storage systems made available from EMC Corporation ("Dell EMC") provides block-level storage services and may provide a virtualized platform on which one or more file servers may be implemented, for example, one or more embedded NAS (eNAS) servers.

Some storage systems may provide one or more distributed file servers that are distributed across multiple separate logical and/or physical components of the storage system. For example, a file server may be distributed among multiple processing nodes of a cluster, where one or more of the processing nodes of the cluster may reside on separate, physically discrete components of the storage system, which may be desirable for fault tolerance and high availability (HA) in the event of a failure of one of the physically discrete components. The separate, physically discrete components of the storage system described above may be referred to herein as "storage processing modules," and a processing node of a cluster may be referred to herein simply as a "node."

A distributed file system (as well as other distributed applications) may include multiple functional components, and each node of the distributed file system may include an instance of the functional component, where the instance itself may be referred to herein a functional component (or simply "component") of the node, or "node component." Each node component may be executed as its own operating system (OS) process, separate and apart from OS processes executing other node components. For example, a distribute file server (e.g., eNAS) may include a data path component (e.g., software-defined NAS, "SDNAS") and a control path component for managing control path aspects of the file server. According, each file server node may include a data path component and a control path component.

In some cases, it may be desirable for different node components that are instances of a same functional component of a distributed application to serve different roles with respect to the function being implemented by the functional component. For example, for a distributed file server having multiple control path components distributed across multiple processing modules (e.g., director boards) of a storage system (e.g., a PowerMax system), it may be desirable that a control path component of a first node serve a master role—i.e., as a control path master (also referred to herein as a master control path component), and one or more control path components of one or more other nodes to serve an agent role—i.e., as a control path agent (also referred to herein as an agent control path component). For example, a control path master may be configured (e.g., programmed in software) to receive control path requests, execute control path functions and delegate execution of control path functions to a control path agent, and a control path agent may be configured to execute control path functions delegated by the master control path component, but not to receive control path requests and not to delegate execution of control path functions.

It may be desirable from time-to-time to change the roles of node components, for example, to change a control path master to a control path agent and/or change a control path agent to a control path master. Such changes may be desirable for load balancing purposes, for example, if the workload of the processing module of the control path master is high, e.g., so high that performance is degrading, whereas the workloads of one or more other processing modules of one or more control path agents are relatively low. In such cases, it may be desirable to move the role of master to another node component on another processing module; i.e., to change one of the control path agents to a control path master and change the control path master to a control path agent.

In some cases, it may be necessary to change roles because of an event on the system, for example, a failure of one or more components causing the need to change roles in accordance with high availability (HA) requirements or objectives of the storage system. For example, if the processing module on which the control path master resides fails, it may not be possible to receive control path management requests until either the failed processing module is restored and the control path master restarted or a new control path master is instantiated. Faced with the foregoing two options, it may be more desirable to choose the latter and change one of the control path agents into a control path master, rather than waiting for the processing module to be restored.

Unfortunately, regardless of the reasons for doing so, changing a control path master into a control path agent, or vice versa, may require a re-booting of the control path component, including terminating the OS process implementing the control path component (i.e., master or agent) and executing a new process for the control path component in its new role. For example, to change a control path agent into control path master, the OS process implementing the control path agent may be terminated, and a new process for the control path component initiated. The new process may be initiated, for example, by executing a different software entity (e.g., Java archive (JAR) file and/or config file) than was executed for the previous process that implemented the previous role, where the different software entity defines the required services to serve as a control path master. Alternatively, the new process may be initiated by executing a same software entity, but with different run-time parameter values specified, where the run-time parameter values trigger inclusion of services required to serve as a control path master in the new process. Regardless of how the new process is initiated, the new control path master cannot be used until the reboot process is complete, which can take on the order of seconds, perhaps tens of seconds. During this reboot process, control path management requests may not be capable of being served, causing perhaps unacceptable delay on the storage system that degrades performance. Further, the reboot process consumes system resources that could otherwise be used for other purposes.

What may be desirable is a way to change the role of a node component that does not require terminating a current OS process implementing the node component and initiating a new OS process to implement the new role, to thereby avoid the delay and resource consumption inherent in doing so.

Described herein are techniques and mechanisms for changing the role of a node component without the need to terminate the current OS process implementing the node component. For example, a control path master may be changed to a control path agent and/or a control path agent may be changed to a control path master without having to reboot the underlying OS process. While embodiments described herein are described in relation to a storage system, the invention is not so limited, but rather embodiments may be applied on other types of systems, including host systems. Further, while embodiments described herein are described in relation to virtualized environments, the invention is not so limited, but rather embodiments may be applied in non-virtualized environments. Also, while embodiments described herein are described in relation to components of a node of a distributed application, the invention is not so limited, but rather embodiments may be applied to the node as a whole. That is, the role of an entire node may be changed using the techniques described herein, and the node may not even include different functional components. In addition, while embodiments described herein are described in relation to control path components, the invention is not so limited, but rather embodiments may be applied to functional components implementing other functionality, including other components of a file server node. Further, while embodiments described herein are described in relation to a distributed file server, the invention is not so limited, but rather embodiments may be applied to other types of distributed or non-distributed applications.

The role of a control path master may be defined to include a group of one or more services, including, but not limited to, one or more services for receiving control path requests, executing control path functions and delegating execution of control path functions to control path agent. The role of a control path agent may be defined to include a group of one or more services, including, but not limited to, one or more services for executing control path functions (e.g., delegated by the master control path component), but the role of a control path agent may not be defined to include receiving control path requests and delegating execution of control path functions, as these functions may be reserved for a control path master.

A first component on a first node of a distributed file server may be designated as a control path master and configured to execute the first group of one or more services defined for the control path master as part of a first OS process. One or more other components on one or more other nodes of the distributed file server may be designated as a control path agent and configured to execute the second group of one or more services defined for the control path agent as part of a respective second OS process.

In some embodiments, each service of the first group and the second group may be defined as a unit of instructions ("executable unit") that is capable of being instantiated and executed independently of other executable units defining other services. For example, in some embodiments, a file server node and/or components of the file server node, including control path components (e.g., master and agent) may be implemented using an event-driven and/or asynchronous application framework such as, for example, Vert.x made available from the Eclipse Foundation, and each independently executable service (which may be considered a micro-service) may be implemented as a Vert.x executable unit called a "Verticle." As of the date of filing of this application, Vert.x is described at the Vert.x website found at https://vertx.io, the entire contents of which is hereby incorporated by reference. In some embodiments, a distributed file system application implemented using Vert.x technology may be considered a reactive application.

A control path component (e.g., master or agent) may be executed as an OS process. Each control path service may be defined as an independently executable unit (e.g., a Verticle) to perform one or more functions, for example, in response to one or more specific types of events. The control path service may be configured such that service requests received at the control path service generate events, and each event is consumed ("picked-up") by a thread of the OS process, which may instantiate an instance of the appropriate executable unit (e.g., Verticle) to perform the appropriate service in response to the service request. It should be appreciated that each executable unit defining a service may be executed by a thread asynchronously such that it is not required that the one or more functions defined by the executable unit complete executing before the thread is capable of consuming other events and initiate execution of other executable units, such that the thread is not blocked causing computational delay.

Each service embodied as an executable unit may itself initiate execution of another service embodied as an executable unit, for example, using asynchronous messaging, e.g., via a Vert.x event bus. For example, an instance of a Verticle defining a service responding to a control path request from a management client may be configured to asynchronously initiate another Verticle defining a service for accessing control path metadata on a storage system.

Configuring a control path component to execute a service may include deploying an executable unit (e.g., a Verticle) to the OS process implementing the control path component, for example, in embodiments in which event-driven asynchronous programming technology (e.g., Vert.x or other technologies) are employed as described herein. After being deployed to the OS process, the executable unit may be instantiated by a thread of the OS process in response to an event generated in response to an action (e.g., receiving a control path request from a management client). Conversely, configuring a control path component to not be able to execute a service may include undeploying an executable unit (e.g., a Verticle) from the OS process implementing the control path component. After being undeployed from the OS process, the executable unit may no longer be instantiated by a thread of the OS process in response to an event. Accordingly, a control path component may be configured to be able to execute one or more services, and to not execute one or more services that it could previously execute, without having to reboot the OS process implementing the control path component—i.e., without having to terminate the OS process and launch another OS process. Thus, a control path master may be changed to a control path agent, and a control path agent may be changed to a control path master, without having to reboot the control path component in question.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
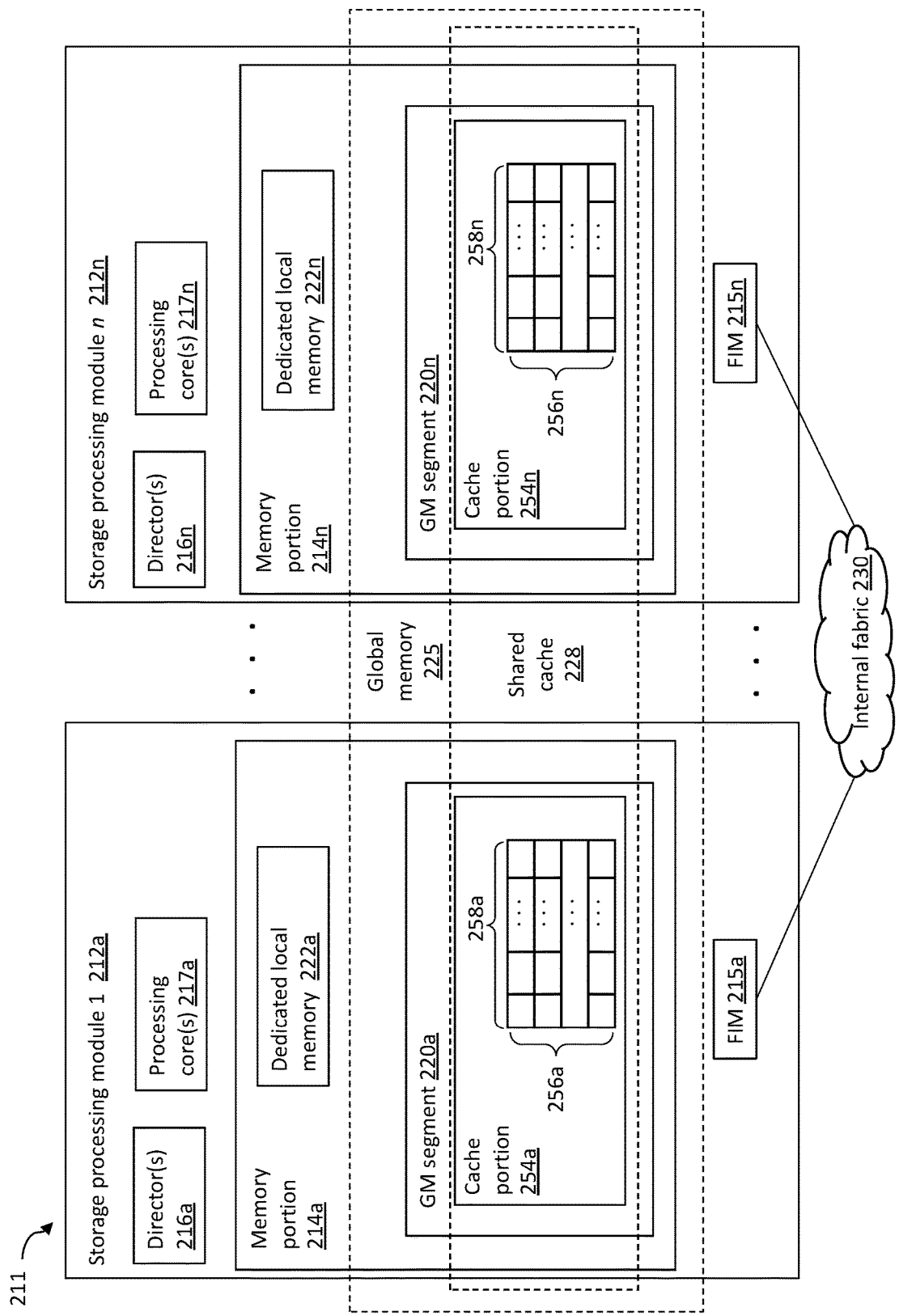
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "storage processing modules." Storage system 211 may include a plurality of storage processing modules 212a-212n and a fabric 230 (e.g., internal fabric 30) over which the storage processing modules 212a-n may communicate. Each of the storage processing modules 212a-212n may include components thereon as illustrated. The fabric 230 may include, for example, one or more switches and connections between the switch(es) and storage processing modules 212a-212n. In at least one embodiment, the fabric 230 may be an IB fabric. In some embodiments, multiple processing 212a-n nodes may be implemented on a single physically discrete component; e.g., two storage processing modules 212a-n may be implemented on single engine of PowerMax storage system.

In the following paragraphs, further details are described with reference to storage processing module 212a but each of the N storage processing modules in a system may be similarly configured. For example, storage processing module 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the storage processing module 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective storage processing module 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the storage processing modules 212a-n may, respectively, also include memory portions 214a-n. The memory portion of each storage processing module may be characterized as locally accessible with respect to that particular storage processing module, and more specifically with respect to other components on the same storage processing module. For example, storage processing module 212a includes memory portion 214a which is memory that is local to that particular storage processing module 212a. Data stored in memory portion 214a may be directly accessed by any of the processing cores 217a (e.g., executing instructions on behalf of one of the directors 216a) of the storage processing module 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of storage processing modules 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any storage processing module 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single storage processing module. In at least one embodiment where there is a single director denoted by 216a (and generally by each of 216a-n), data stored in the dedicated local memory 222a may be accessed by the respective single director 216a located on the same storage processing module 212a. However, the remaining directors located on other ones of the N storage processing modules may not access data stored in the dedicated local memory 222a.

To further illustrate, GM segment 220a may include information such as user data stored in the cache portion 220a, metadata, and the like, that is accessed (e.g., for read and/or write) generally by any director of any of the storage processing modules 212a-n. Thus, for example, any director 216a-n of any of the storage processing modules 212a-n may communicate over the fabric 230 to access data in GM segment 220a. In a similar manner, any director 216a-n of any of the storage processing modules 212a-n may generally communicate over fabric 230 to access any GM segment 220a-n of the distributed GM. Although a particular GM segment, such as 220a, may be locally accessible to directors on one particular storage processing module, such as 212a, any director of any of the storage processing modules 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on storage processing module 212a configured for local use solely by components on the single/same storage processing module 212a. For example, dedicated local memory 222a may include data described in following paragraphs which is used and accessed only by directors 216a included on the same storage processing module 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the storage processing modules 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store IO data (e.g., for servicing read and write operations).

Each cache portion 254a-n may be a portion of a shared cache 228 (e.g., cache 28) distributed across the storage processing modules 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process IO on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
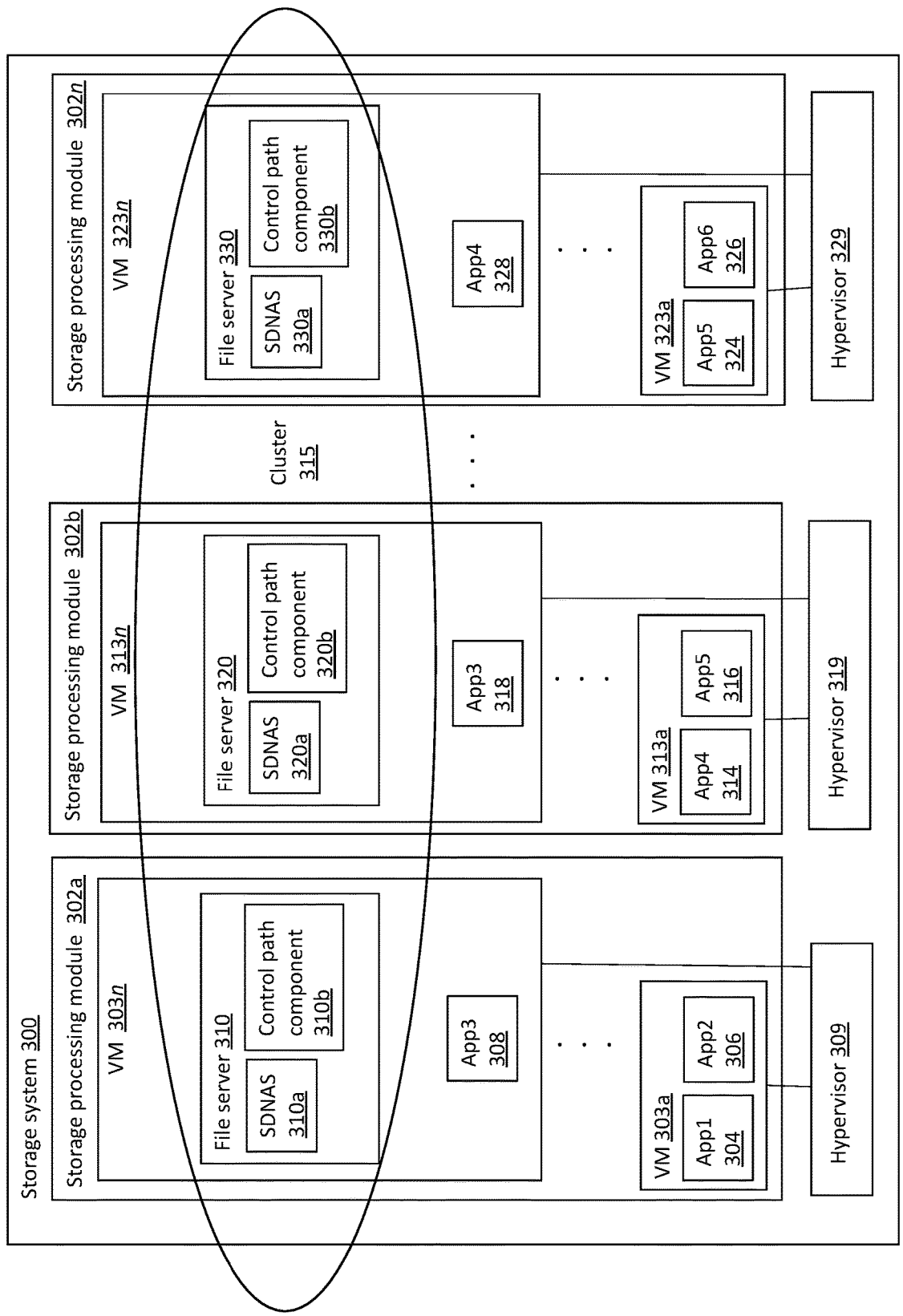
FIG. 3 is a block diagram illustrating an example of a system for managing storage system node components, according to embodiments of the invention.

In some embodiments of the invention, it may be desirable to managing storage system node components, for example, the control path management component of a file server node. FIG. 3 is a block diagram illustrating an example of a storage system 300 for managing storage system node components, according to embodiments of the invention. Other embodiments of a storage system 300 for managing storage system node components, for example, variations of the storage system 300, are possible and are intended to fall within the scope of the invention. The storage system 300 may be part of a storage network, for example, the storage network 10 or a variation thereof.

The storage system 300 may be storage system 20a or a variation thereof, and may include storage processing modules 302a-n (e.g., 212a-n). In some embodiments, the storage system 300 may be a PowerMax storage system and storage processing nodes 302a-n may be director boards.

Each of the storage processing modules may include a plurality of processing nodes, which may be implemented using software, firmware, or a suitable combination thereof. In some embodiments, the processing nodes may be implemented as VMs using virtualization software. For example, the storage processing module 302a may include VMs 303a-n running (e.g., executing as threads) on hypervisor 309; the storage processing node 302b may include VMs 313a-n running (e.g., executing as threads) on hypervisor 319; and the storage processing node 302n may include VMs 323a-n running (e.g., executing as threads) on hypervisor 329. In some embodiments, any of VMs 303a-n, 313aa-n and 323a-n may be guest operating systems (OSs) running on a storage hypervisor provided by a Hypermax™ OS of a PowerMax storage system.

One or more applications may run within each VM. For example, App1 304 and App2 306 may run within VM 303a, App3 308 and file server 310 may run within the VM 303n, App4 314 and App5 316 may run within VM 313a, file server 320 and App3 318 may run within the VM 313n, App5 324 and App6 326 may run within VM 323a, and file server 330 and App4 328 may run within the VM 323n. In some embodiments, an application may be a distributed application running within multiple VMs of a cluster executing on one or more storage processing modules. For example, the file server 310, file server 320 and the file server 330 may be instances of a same distributed file server running within cluster 315.

Each file server node of the cluster 215 may include a multiple components. For example, the file server 310 may include SDNAS 310a and control path component 310b; the file server 320 may include SDNAS 320a and control path component 320b; and the file server 330 may include SDNAS 330a and control path component 330b.

Figure 4:
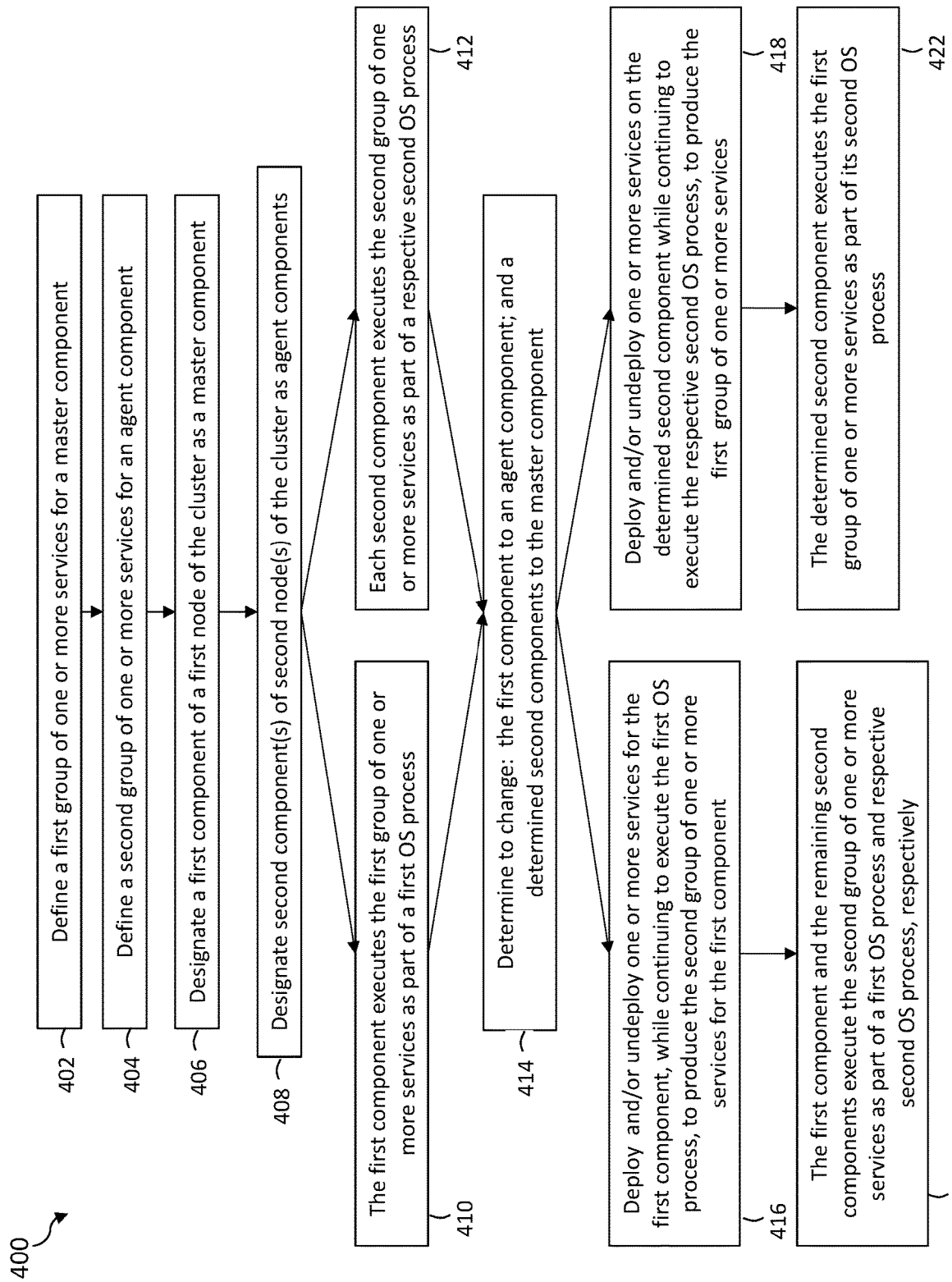
FIG. 4 is a flow chart illustrating a method of changing roles of node components of a distributed application, according to embodiments of the invention.

FIG. 4 is a flow chart illustrating a method 400 of changing roles of node components of a distributed application, according to embodiments of the invention. Other embodiments of a method 400 of changing roles of node components of a distributed application, for example, variations of the method 300, are possible and are intended to fall within the scope of the invention. One or more steps of the method 400, or parts thereof may be implemented on the storage system 300 and may use an event-driven and/or asynchronous programming framework such as, for example, Vert.x.

In a step 402, a first group of one or more services for a master component may be defined, and in a step 404, a second group of one or more services for an agent component may be defined, for example, as described in more detail herein.

In a step 406, a first component of a first node of the cluster may be designated as a master component, and, in a step 408, one or more second components of one or more second nodes of the cluster may be designated as agent components, for example, as described in more detail elsewhere herein.

In a step 410, the first component may execute the first group of one or more services as part of a first OS process, which may include, for example, deploying the first group of services (e.g., Verticles) to the first OS process, e.g., as described in more detail elsewhere herein. Concurrently to the performance of the step 410, or parts thereof, each second component may execute the second group of one or more services as part of a respective second OS process, which may include, for example, deploying the second group of services (e.g., Verticles) to the respective second OS process, e.g., as described in more detail elsewhere herein.

In a step 414, it may be determined to change the first component to an agent component, and/or it may be determined to change a second component to the master component, for example, for load balancing, or in response to an event to maintain HA requirements or objectives, for example, as described in more detail herein.

In a step 416, one or more services may be deployed and/or undeployed for the first component, while continuing to execute the first OS process, to produce the second group of one or more services for the first component. Concurrently to the performance of the step 416, at least in part, one or more services on the determined second component may be deployed and/or undeployed while continuing to execute the respective second OS process, to produce the first group of one or more services for the determined second component.

In a step 420, the first component and the remaining second components may execute the second group of one or more services as part of a first OS process and respective second OS process, respectively, and, concurrently to the performance of the step 420, the determined second component may execute the first group of one or more services as part of its second OS process.

FIGS. 5A and 5B illustrate an example of changing roles of node components of a distributed application, for example, by performance of the method 400, according to embodiments of the invention.

FIG. 5A includes the control component 310b and the control path component 320b, described in relation to the FIG. 3. FIG. 5A may represent a state of the control path component 310b and a state of the control path component 320b after performance of the steps 402-408 of the method 400. The control path component 310b may be configured as a control path master, and as such may be defined to include master services 504, a group of services including service A 502a, service B 502b, service C 502c, service D 502d and service 502e. Each of the master services 504 may be any of a plurality of services for control path management such as, for example, any of: an http service, a remote command execution service, a database (e.g., postgresql) access service, a service-publishing service, an inter-node message queue service, a service discovery service, a command handler service, other service, or any suitable combination of the foregoing. The master services 504 may be executed as part of the OS process 1 501 implementing the control path component 310b, for example, as part of the step 410.

The control path component 320b may be configured as a control path agent, and as such may be defined to include agent services 506, a group of services including service A 502a, service B 502b, and service C 502c. Each of the agent services 506 may be any of a plurality of services for control path management such as, for example, any of those described herein. The agent services 504 may be executed as part of the OS process 2 503 implementing the control path component 320b, for example, as part of the step 412. As illustrated in FIG. 5A, the agent services 506 may be a subset of the master services 504. However, it should be appreciated that the invention is not so limited, as: the agent services 506 may include one or more services not included in the master services 504; the agent services 506 may have no services in common with the master services 504; the agent services 506 may include all the same services as the master services 504; or the agent services 506 may be a superset of the master services 504.

The FIG. 5B may represent control path 310b and the control path 320b after the control path component 310b has been changed from a control path master to a control path agent, for example, by performance of the step 416; and after the control path component 320b has been changed from a control path agent to the control path master, for example, by performance of the step 418. The control path component 310b now may be configured as a control path agent, and as such may be defined to include agent services 506. The agent services 504 may be executed as part of the OS process 1 501, for example, as part of the step 420. The OS process 1 501 may have remained continuously executing while the control path component 310b role was changed from the control path master to a control path agent.

The control path component 320b now may be configured as the control path master, and as such may be defined to include master services 504 The master services 506 may be executed as part of the OS process 2 503, for example, as part of the step 422. The OS process 2 503 may have remained continuously executing while the role of the control path component 320b was changed from a control path agent to the control path master.

Various embodiments of the invention may be combined with each other in appropriate combinations. Additionally, in some instances, the order of steps in the flowcharts, flow diagrams and/or described flow processing may be modified, and steps illustrated as being performed in series, or portions thereof, may be performed concurrently, where appropriate. It should be appreciated that any of the methods described herein, including method 400, or parts thereof, may be implemented using one or more of the systems and/or data structures described in relation to FIGS. 1-3 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, any suitable combination thereof.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage system including a cluster of processing nodes collectively executing a distributed application, wherein a first of the processing nodes serves a first role of a functional component of the distributed application, the first role defined by a first group of one or more services, a method comprising:
    configuring a first operating system process of the first processing node, wherein said configuring configures the first operating system process to serve the first role of a master role by executing the first group of one or more services as part of the first operating system process;
    determining to change the first role of the master role of the first operating system process of the first processing node to a second role of an agent role of the functional component, wherein the second role of the agent role is defined by a second group of one or more services; and
    responsive to said determining to change the first role of the master role of the first operating system process to the second role of the agent role, changing the first role of the master role of the first operating system process of the first processing node to the second role of the agent role, while the first operating system process continues to execute, by changing the first operating system process to execute the second group of one or more services of the functional component.

2. The method of claim 1, wherein each service of the first group and each service of the second group is an independently executable unit of instructions.

3. The method of claim 2, wherein the first operating system process includes a plurality of threads, wherein each of the one or more services of the first group and the one or more services of the second group are executable by any of the plurality of threads asynchronously.

4. The method of claim 2, wherein changing the first operating system process to execute the second group of one or more services includes at least one of:
    undeploying one or more of the executable units that constitute the one or more services, respectively, of the first group so that the undeployed executable units are no longer executable by the first operating system process; or
    deploying one or more of the executable units that constitute the one or more services, respectively, of the second group so that the one or more deployed executable units are executable by the first operating system process.

5. The method of claim 1, wherein the distributed application is a distributed file system, and the functional component is a control path component of the distributed file system.

6. The method of claim 5, wherein the first role is the master role of a master control path component that: receives control path requests, executes control path functions and delegates execution of control path functions to agent control path components, and
    wherein the second role is the agent role of an agent control path component that: executes control path functions delegated by the master control path component; does not receive control path requests; and does not delegate execution of control path functions.

7. The method of claim 1, wherein at least a second operating system process of a second of the plurality of nodes initially serves the second role of the agent of the functional component where the second operating system process executes the second group of one or more services, and wherein the method further comprises:
    changing the second role of the agent role of the second processing node to the first role of the agent role, while the second operating system process continues to execute, by changing the second operating system process to execute the second group of one or more services.

8. A storage system comprising:
    a cluster of processing nodes collectively executing a distributed application, wherein a first of the processing nodes serves a first role of a first functional component of the distributed application, the first role defined by a first group of one or more services; and
    executable logic that implements a method including:
        configuring a first operating system process of the first processing node, wherein said configuring configures the first operating system process to serve the first role of a master role by executing the first group of one or more services as part of the first operating system process;
        determining to change the first role of the master role of the first operating system process of the first processing node to a second role of an agent role of the functional component, wherein the second role of the agent role is defined by a second group of one or more services; and
        responsive to said determining to change the first role of the master role of the first operating system process to the second role of the agent role, changing the first role of the master role of the first operating system process of the first processing node to the second role of the agent role, while the first operating system process continues to execute, by changing the first operating system process to execute the second first group of one or more services of the functional component.

9. The storage system of claim 8, wherein each service of the first group and each service of the second group is an independently executable unit of instructions.

10. The storage system of claim 9, wherein the first operating system process includes a plurality of threads, wherein each of the one or more services of the first group and the one or more services of the second group are executable by any of the plurality of threads asynchronously.

11. The storage system of claim 9, wherein changing the first operating system process to execute the second group of one or more services includes at least one of:
    undeploying one or more of the executable units that constitute the one or more services, respectively, of the first group so that the undeployed executable units are no longer executable by the first operating system process; or
    deploying one or more of the executable units that constitute the one or more services, respectively, of the second group so that the one or more deployed executable units are executable by the first operating system process.

12. The storage system of claim 8, wherein the distributed application is a distributed file system, and the functional component is a control path component of the distributed file system.

13. The storage system of claim 12, wherein the first role is the master role of a master control path component that: receives control path requests, executes control path functions and delegates execution of control path functions to agent control path components, and wherein the second role is the agent role of an agent control path component that: executes control path functions delegated by the master control path component; does not receive control path requests; and does not delegate execution of control path functions.

14. The storage system of claim 8, wherein at least a second operating system process of a second of the plurality of nodes initially serves the second role of the agent of the functional component where the second operating system process executes the second group of one or more services, and wherein the method further comprises:

changing the second role of the agent role of the second processing node to the first role of the agent role, while the second operating system process continues to execute, by changing the second operating system process to execute the second group of one or more services.

15. For a storage system including a cluster of processing nodes collectively executing a distributed application, wherein a first of the processing nodes serves a first role of a first functional component of the distributed application, the first role defined by a first group of one or more services, non-transitory computer-readable media having software stored thereon, the software comprising:

executable code that configures a first operating system process of the first processing node to serve the first role of a master role by executing the first group of one or more services as part of the first operating system process;

executable code to determine to change the first role of the master role of the first processing node to a second role of an agent role of the functional component, wherein the second role of the agent role is defined by a second group of one or more services; and executable code that, responsive to determining to change the first role of the master role of the first operating system process to the second role of the agent role, changes the first role of the master role of the first processing node to the second role of the agent role, while the first operating system process continues to execute, by changing the first operating system process to execute the second group of one or more services of the functional component.

16. The non-transitory computer-readable media of claim 15, wherein each service of the first group and each service of the second group is an independently executable unit of instructions.

17. The non-transitory computer-readable media of claim 16, wherein the first operating system process includes a plurality of threads, wherein each of the one or more services of the first group and the one or more services of the second group are executable by any of the plurality of threads asynchronously.

18. The non-transitory computer readable media of claim 16, wherein changing the first operating system process to execute the second group of one or more services includes at least one of:

undeploying one or more of the executable units that constitute the one or more services, respectively, of the first group so that the undeployed executable units are no longer executable by the first operating system process; or deploying one or more of the executable units that constitute the one or more services, respectively, of the second group so that the one or more deployed executable units are executable by the first operating system process.

19. The non-transitory computer readable media of claim 15, wherein the distributed application is a distributed file system, and the functional component is a control path component of the distributed file system.

20. The non-transitory computer readable media of claim 19, wherein the first role is the master role of a master control path component that: receives control path requests, executes control path functions and delegates execution of control path functions to agent control path components, and wherein the second role is the agent role of an agent control path component that: executes control path functions delegated by the master control path component; does not receive control path requests; and does not delegate execution of control path functions.

\* \* \* \* \*